United States Patent Office 3,034,860
Patented May 15, 1962

3,034,860
PRODUCTION OF POLYMERIC PHOSPHORUS PENTOXIDE
Fred McCollough, Jr., Chicago Heights, Ill., assignor to Stauffer Chemical Company, New York, N.Y., a corporation of Delaware
No Drawing. Filed Apr. 4, 1960, Ser. No. 19,518
7 Claims. (Cl. 23—165)

This invention relates to a method for producing polymeric phosphorus pentoxide by direct condensation of vaporous $P_4O_{10}$ molecules to solid polymeric phosphorus pentoxide.

Three crystalline modifications and several amorphous forms of phosphorus pentoxide are presently known. The common commercial crystalline phosphorus pentoxide belongs to the rhombohedral class of the hexagonal system and is known generally as the H-form. The two other crystalline modifications belong to the orthorhombic system and are known as the O and O' forms. All three crystalline forms are sublimable, the H–form having its sublimation temperature at about 365° C. and the O and O' forms subliming at about 570° C. Although the various forms are usually designated (by their simplest chemical formula) as $P_2O_5$, actually the H-form and the vapors of all the solid forms are composed essentially of $P_4O_{10}$ molecules while both the solid crystalline forms with orthorhombic structure are infinite polymers or exhibit a high degree of polymerization. Because of this, the hexagonal or H-form material is often termed "monomeric" and the orthorhombic or O and O' form materials are often termed "polymeric." The polymeric forms are much less reactive than the H-form and are useful in some chemical syntheses where slow or controlled reactivity is desirable.

Preparation of the H-form is a rather well-known art which consists of condensing vaporous $P_4O_{10}$ from a combustion mixture formed by the complete oxidation of elemental phosphorus in dry air. Contrary to the simplicity of the H-form preparation, the O and O' forms have been very difficult to produce. Small quantities have been made by heating H-form in situ, usually under superatmospheric pressure in a sealed container, until the H-form crystals polymerized to the orthorhombic forms, e.g. see Journal American Chemical Society, vol. 65, May 1943, pp. 794-802. Another previously known method consists of forming a particulate mixture of H-form with one or both of the polymeric forms and heating this mixture at atmospheric pressure until the H-form is polymerized. This method is described in United States Patent No. 2,907,635.

These two methods for converting H-form to the O and O' forms by thermal polymerization represent substantially the only effective means heretofore available for producing polymeric $P_2O_5$.

I have now found that polymeric phosphorus pentoxide can be produced directly from vaporous $P_4O_{10}$ by bringing these vapors into contact with particles of one or both forms of polymeric phosphorus pentoxide upon which the $P_4O_{10}$ molecules condense as polymeric material. The orthorhombic particles supply the nuclei to accelerate condensation and effect growth of the crystals through deposition from the vapor phase, by analogy, in much the same way that crystals may be seeded from liquid solutions. This discovery is surprising in view of the belief generally prevalent heretofore that production of the polymeric forms is feasible only by thermal transition through the solid phase.

The principal advantage of the present invention is that it offers a method for producing the orthorhombic material directly from the vapor state, without the necessity of first preparing the H-form, thus obviating a process step in the production of the orthorhombic material.

Another important advantage is that the invention is highly adaptable to continuous operation on a commercial scale.

Broadly stated, the present invention involves preventing substantially the normal condensation of vaporous $P_4O_{10}$ to H-form material while inducing condensation to the orthorhombic forms. The former is accomplished by maintaining fairly high vapor temperatures and the latter by contacting the hot vapors with (seed) particles of polymeric $P_2O_5$. The rate of condensation thus induced is primarily a function of the amount of $P_4O_{10}$ molecules present in the vapor in contact with the orthorhombic particles, and the area of the interface around the particles where the vapor and solids are in contact.

Contact between the $P_4O_{10}$ vapor and the orthorhombic solids may be accomplished by various suitable methods, and may involve passing the vapors either through or over a bed of the particles. The bed may be fixed, agitated, fluidized, falling, entrained, or of any character which allows good vapor-solids contact. Of particular practical value are the fluidized and falling beds which, by their nature, can be adapted to permit the passage of the $P_4O_{10}$ vapor through a fairly dense mass of particles having considerable exposed surface upon which the vapor may condense. With the fluidized bed the vapor is necessarily passed upward through the dense mass, but with the falling bed either concurrent or countercurrent flow of solids and vapors is possible. For fluidized-bed condensation it is preferable to use a turbulent bed of orthorhombic particles having a bed density of at least about 10 lbs./cu. ft. Another advantage of the falling bed is that it permits operation where the orthorhombic solids are at a lower temperature than the $P_4O_{10}$ vapors, thus minimizing sublimation from the orthorhombic particles. This involves dropping cooler orthorhombic particles through a hot stream of vaporous $P_4O_{10}$ and collecting the somewhat warmed solids, having increased weight, as they settle from the zone of contact. Another practical and advantageous technique involves the passage of $P_4O_{10}$ vapors into a tumbled bed such as produced in rotating kilns and similar devices.

Batch or continuous condensation is possible. However, where the latter is employed, it is often found that the $P_4O_{10}$ contained in the vapor stream will not condense completely by one contact while passing through a bed of orthorhombic particles, and should be subsequently recirculated or utilized in some other manner (e.g. condensed by the prior art methods to H-form or perhaps reacted to form the various acids of phosphorus).

Index of refraction data have shown that vaporous $P_4O_{10}$ can be condensed in the bed of orthorhombic material to substantially the same proportions of O and O' forms as are initially contained in the bed. Although there is little advantage for doing so, the pure O and O' forms can be manufactured according to the method of this invention through use of a starting bed containing only that form which it is desired to produce.

A somewhat high temperature must be maintained in the $P_4O_{10}$ vapor stream to overcome the tendency to condense to the H-form, although not so high as to cause appreciable sublimation of orthorhombic particles. Because the orthorhombic particles and the vaporous $P_4O_{10}$ need not necessarily be at the same temperature, in fact, might be advantageously maintained at widely different temperatures, the limitations given herein apply only to the vapor temperature. These temperature limitations depend mainly on three interrelated factors: (1) the pressure under which the $P_4O_{10}$ vapors are maintained, (2) the temperature at which the $P_4O_{10}$ vapors will condense at a substantial rate to H-form, and (3) the temperature at which polymeric phosphorus pentoxide will sublime at a substantial rate. For convenience in description, the term "sublimation point," where used herein, is meant to refer to the actual temperature at which sublimation occurs under any given pressure and, except for conditions at standard atmospheric pressure, is not intended to be synonymous with the term "sublimation temperature."

For a substantially pure polymeric product, either single forms or mixtures, the vapor temperature must be maintained sufficiently high so that little condensation of $P_4O_{10}$ vapor could occur except for the presence of the condensation-promoting orthorhombic particles. This temperature varies with pressure but in all cases is preferably not more than about 100° C. below the sublimation point of H-form. At standard atmospheric pressure, for example, the vapor temperature should not be held below about 265° C. or a large part of the condensing $P_4O_{10}$ vapors will assume the H-form. However, as shown in the examples below, condensation under vacuum can be accomplished at temperatures below 265° C. The lower limit to the vapor temperature, therefore, is not a fixed value but depends upon the pressure, being lower under vacuum and higher under superatmospheric pressure. Furthermore, although condensation of $P_4O_{10}$ vapor is generally known to occur at any temperature below the sublimation point of H-form, the rate of condensation of the vapor is not appreciable at temperatures only slightly below this sublimation point. For convenience in the explanation of this invention the lower temperature limitation will be referred to herein as the "normal condensation point" of vaporous $P_4O_{10}$ and is intended to define the lowest temperature at which $P_4O_{10}$ vapor can be condensed on orthorhombic particles to yield substantially pure polymeric phosphorus pentoxide at any desired pressure. This temperature can be easily estimated from available information on the vapor pressure of H-form and a consideration of the characteristics of $P_4O_{10}$ condensation given above.

The upper temperature limitation of the vapor is at the sublimation point of orthorhombic phosphorus pentoxide (about 570° C. at standard atmospheric pressure). However, where the orthorhombic particles are held at the same temperature as the vapor, the temperature must be maintained about 50–100° C. below the sublimation point in order to prevent sublimation of the particles from exceeding condensation from the vapor. It is preferable, for reasons of practicality, to operate the condensation at near-atmospheric pressure and at a vapor temperature of about 265° C. to about 570° C.

The following examples will further illustrate the method of the present invention.

*Example 1*

An open glass tube containing a narrow constriction in the center was charged with a quantity of H-form at one side of the constriction and 7.46 grams of mixed orthorhombic forms at the other. The tube was placed in an oven and heated to a temperature of 450° C. A stream of dry nitrogen gas was passed into the tube from the end containing the H-form, past the constriction and over the static bed of orthorhombic solids, leaving the tube at the end containing the orthorhombic solids. The nitrogen-$P_4O_{10}$ vapor mixture used for this experiment closely simulates the combustion mixture produced when oxidizing elemental phosphorus in dry air. The stream of nitrogen gas passing through the tube was continued during a 2 hour period while the sample remained in the oven. After this, the orthorhombic particles, which had been kept separate from the H-form particles, were removed from the apparatus and analyzed. The orthorhombic sample was found to have increased in weight by 23% and was composed of all polymeric material.

*Example 2*

A glass tube containing two ceramic boats, one filled with H-form material and the other with orthorhombic material, was heated to 450° C. by a stream of dry air passing from the end containing the orthorhombic material, over the H-form material, and then out of the tube. When the tube and its contents reached a constant temperature of about 450° C. the gas flow was reversed so as to pass over the H-form before passing over the boat containing the orthorhombic forms. The reversal of gas flow was used to facilitate a determination of the condensation rate at 450° C. After ½ hour under the reversed flow conditions the contents of the boat containing the orthorhombic forms was found to have increased in weight by 17%. No H-form was found to be present in the orthorhombic boat and the material causing the increase in weight was substantially all orthorhombic $P_2O_5$.

*Example 3*

A sealed tube, divided into two compartments by a narrow constriction and having H-form in one compartment and orthorhombic forms in the other, was heated at 450° C. for 17 hours. The tube had been evacuated to a pressure of 50 mm. Hg before sealing. The original 2.5 gram sample of orthorhombic material increased in weight by 64% during heating. The material causing the increase in weight was substantially all orthorhombic $P_2O_5$.

*Example 4*

H-form material was loaded in the bottom of a test tube and above this was placed a packed bed containing 9.6 grams of mixed orthorhombic $P_2O_5$. The tube was placed in an oven at 250° C. where it was held overnight at a reduced pressure of 1–2 mm. Hg. The H-form material sublimed completely, passing upward through the dense bed of O and O' forms, and condensing in a significant amount along a cooler portion of the tube leading to the vacuum apparatus. The material condensed along the tube was found to be monomeric while that which condensed in the orthorhombic bed, about 13% by weight, was found to be polymeric.

*Example 5*

The experiment described in Example 4 was repeated without adding any polymeric $P_2O_5$ to the test tube. Most of the H-form material sublimed and condensed on cooler portions of the tube leading to the vacuum apparatus. The unsublimed material, and the sublimed material which condensed on the sides of the cooler portions of the tube were found to be all H-form.

*Example 6*

Using a bed of pure O-form polymeric phosphorus pentoxide as the condensation-promoting medium, the procedure for producing polymeric material outlined in Example 1 was repeated. After condensation the polymeric bed was found to have increased in weight, and the additional material and the original bed were found to be substantially all O-form polymeric phosphorus pentoxide.

The vaporous $P_4O_{10}$ starting material of the present invention may be supplied from sublimed $P_2O_5$ solids, e.g., the sublimation of any of the amorphous of solid crystalline forms, as well as $P_4O_{10}$ produced by the complete oxidation of elemental phosphorus (the present commercial route to H-form $P_2O_5$). The vapor produced from sublimation of the solid forms may contain only $P_4O_{10}$ molecules, but the vapor produced by oxidation of elemental phosphorus will also contain the residual gases from the combustion air, mainly nitrogen, and any excess air which might be used to insure complete combustion. The starting material for the bed consists of particles of orthorhombic (polymeric) $P_2O_5$, either one single form, or a mixture of the O and O' forms (the material of current commercial interest).

Many variations and modifications are within the scope and spirit of this invention, and therefore no unnecessary limitations should be understood from the above specification.

What is claimed is:

1. A method for producing polymeric phosphorus pentoxide which consists of passing $P_4O_{10}$ vapors, maintained at a temperature above the normal condensation point of $P_4O_{10}$ vapors and below the sublimation point of polymeric form phosphorus pentoxide, into intimate contact with particles of crystalline polymeric phosphorus pentoxide whereupon the $P_4O_{10}$ vapors condense to crystalline polymeric phosphorus pentoxide.

2. The method as set forth in claim 1 wherein the $P_4O_{10}$ vapors are passed through a bed of polymeric phosphorus pentoxide particles having a bed bulk density of at least 10 lbs. per cu. ft.

3. The method as set forth in claim 1 wherein the $P_4O_{10}$ vapors are passed over the surface of a static bed of polymeric phosphorus pentoxide particles.

4. A method for producing polymeric phosphorus pentoxide which consists of passing $P_4O_{10}$ vapors, maintained under substantially standard atmospheric pressure and at a temperature within the range of about 265° C. to about 570° C., into intimate contact with a bed of crystalline polymeric phosphorus pentoxide particles whereupon the $P_4O_{10}$ vapors condense to crystalline polymeric phosphorus pentoxide.

5. The method as set forth in claim 4 wherein the $P_4O_{10}$ vapors are contained in a vaporous combustion mixture produced by complete oxidation of elemental phosphorus in air.

6. A method for producing substantially pure crystalline O-form phosphorus pentoxide which consists of passing $P_4O_{10}$ vapors, maintained at a temperature above the normal condensation point of $P_4O_{10}$ vapors and below the sublimation point of O-form phosphorus pentoxide, into intimate contact with particles of crystalline O-form phosphorus pentoxide whereupon the $P_4O_{10}$ vapors condense to crystalline O-form phosphorus pentoxide.

7. A method for producing substantially pure crystalline O'-form phosphorus pentoxide which consists of passing $P_4O_{10}$ vapors, maintained at a temperature above the normal condensation point of $P_4O_{10}$ vapors and below the sublimation point of O'-form phosphorus pentoxide, into intimate contact with particles of crystalline O'-form phosphorus pentoxide whereupon the $P_4O_{10}$ vapors condense to crystalline O'-form phosphorus pentoxide.

References Cited in the file of this patent

UNITED STATES PATENTS

| | | |
|---|---|---|
| 2,907,635 | Tucker | Oct. 6, 1959 |
| 2,988,426 | Cross et al. | June 13, 1961 |